US011976514B2

(12) United States Patent
Kusaslan

(10) Patent No.: US 11,976,514 B2
(45) Date of Patent: May 7, 2024

(54) CHILD WINDOW SAFETY SYSTEM

(71) Applicant: WINSTOP PENCERE GUVENLIK SISTEMLERI SANAYI VE TICARET LIMITED SIRKETI, Istanbul (TR)

(72) Inventor: Deniz Kusaslan, Istanbul (TR)

(73) Assignee: WINSTOP PENCERE GUVENLIK SISTEMLERI SANAYI VE TICARET LIMITED SIRKETI, Istanbul (TR)

(*) Notice: Subject to any disclaimer, the term of this patent is extended or adjusted under 35 U.S.C. 154(b) by 642 days.

(21) Appl. No.: 17/051,175

(22) PCT Filed: Aug. 6, 2018

(86) PCT No.: PCT/TR2018/000081
§ 371 (c)(1),
(2) Date: Oct. 28, 2020

(87) PCT Pub. No.: WO2019/212422
PCT Pub. Date: Nov. 7, 2019

(65) Prior Publication Data

US 2021/0054688 A1 Feb. 25, 2021

(30) Foreign Application Priority Data

May 3, 2018 (TR) ................................ 2018/06277

(51) Int. Cl.
*E06B 9/01* (2006.01)
*E06B 9/00* (2006.01)

(52) U.S. Cl.
CPC .......... *E06B 9/01* (2013.01); *E06B 2009/002* (2013.01); *E06B 2009/015* (2013.01)

(58) Field of Classification Search
CPC ........ E06B 9/01; E06B 9/02; E06B 2009/015; E06B 2009/002; E06B 11/021; E04H 17/163
See application file for complete search history.

(56) References Cited

U.S. PATENT DOCUMENTS

| | | | | |
|---|---|---|---|---|
| 526,123 A * | 9/1894 | Boots | ...................... F16G 11/06 | 403/396 |
| 1,540,788 A * | 6/1925 | McClure | ................. E04C 2/422 | 52/799.12 |

(Continued)

FOREIGN PATENT DOCUMENTS

| | | | |
|---|---|---|---|
| CN | 2908743 Y * | 6/2007 | |
| CN | 202544712 U | 11/2012 | |

(Continued)

OTHER PUBLICATIONS

CN 105401866; Huang (machine translation) (Year: 2017).*
TWM423151; Li (machine translation) (Year: 2012).*

*Primary Examiner* — Abe Massad
(74) *Attorney, Agent, or Firm* — Bayramoglu Law Offices LLC

(57) ABSTRACT

A child window safety system based on building a reliable safety net to prevent children from leaning and falling out through open windows is installed and uninstalled without any damage to a window. The child window safety system is mass produced to fit windows at all sizes for an installer to form a window gap vertically and horizontally with thin steel cords and fastening the thin cords to each other at an installation site.

8 Claims, 7 Drawing Sheets

(56) References Cited

U.S. PATENT DOCUMENTS

| | | | | | |
|---|---|---|---|---|---|
| 2,103,130 | A * | 12/1937 | Windle | E06B 9/01 52/106 |
| 2,118,032 | A * | 5/1938 | Gibson | E06B 9/01 52/645 |
| 3,414,237 | A * | 12/1968 | Bishoff, Sr. | E04H 17/163 52/799.12 |
| 4,127,156 | A * | 11/1978 | Brandt | E06B 9/01 160/369 |
| 4,132,390 | A * | 1/1979 | Pfarr, Jr. | E04H 17/066 256/73 |
| 4,221,038 | A * | 9/1980 | Singer | B23P 15/12 52/799.12 |
| 5,492,164 | A | 2/1996 | Gist | |
| 5,620,036 | A * | 4/1997 | Grous | E06B 9/02 160/369 |
| 5,916,074 | A | 6/1999 | Tracy | |
| 6,263,547 | B1 * | 7/2001 | Andersson | F16G 11/06 24/135 R |
| 6,415,564 | B1 * | 7/2002 | Beer | E04H 17/10 256/54 |
| 8,291,961 | B2 * | 10/2012 | Grun | E06B 9/01 160/371 |
| 2014/0262085 | A1 * | 9/2014 | Mitchell | E06B 9/01 160/378 |
| 2016/0002973 | A1 * | 1/2016 | Grun | E06B 9/06 49/50 |

FOREIGN PATENT DOCUMENTS

| | | | |
|---|---|---|---|
| CN | 105421978 | A | 3/2016 |
| CN | 105401866 | B * | 4/2017 |
| IN | 102865029 | A | 1/2013 |
| TR | 200804168 | U | 9/2008 |
| TR | 201110085 | | 10/2011 |
| TR | 201500180 | | 1/2015 |
| TW | 423151 | U * | 2/2012 |

* cited by examiner

CHILD WINDOW SAFETY SYSTEM

CROSS REFERENCE TO THE RELATED APPLICATIONS

This application is the national stage entry of International Application No. PCT/TR2018/000081, filed on Aug. 6, 2018, which is based upon and claims priority to Turkish Patent Application No. 2018/06277, filed on May 3, 2018, the entire contents of which are incorporated herein by reference.

TECHNICAL FIELD

This invention is about an aesthetic and reliable child window safety system to prevent children from leaning and falling out through open windows, which can be easily installed and uninstalled without any damage to the window, and that can be mass produced to fit windows at all sizes.

BACKGROUND

Windows are kept open, especially during summer months, to cool and air the rooms in dwellings. Not opening the windows causes an unpleasant condition inside and when they are open, there is the serious risk for small children to fall. For this reason we frequently hear the news of children falling out the windows.

Existing systems that provide safety for children against open windows are usually based on partially opening windows, or installing fixed or modular rails made up of metal profiles on the exterior of the window.

Hopper type windows that are based on the principle of half open windows, partially open up on the top can prevent children from falling, while enabling ventilation in the room. Additionally, safety cables fixed between the window and the frame similarly allow the windows to open up to 15-20 cm and prevent children from falling. However, since the windows cannot be opened completely with those practices, the desired convenience cannot be achieved. With such practices, from time to time, people may leave the windows completely open when the children are not at home or they are in another room, where the possibility of forgetting the windows open constitutes a serious risk for children.

In case of fully opening window, rail systems made up of metal profiles are used to prevent children from falling and these rails are installed on the exterior of the windows, onto the wall or the window frame profile.

Utility model document numbered 2008/04168, titled "Open window safety system" can be given as an example of the state of the art. In the summary part of this document it is stated that: "This invention is a reliable and practical product, made up of profile, fixing bolt, profile fixing screw, angle iron fixing bolt, stopper, PVC fixing bolt, nut movement range, nut, angle iron, fastening hole, PVC window, screw, circular sheet metal, and plastic parts, specifically developed to prevent children from falling and leaning out of the window".

Utility model document numbered 2011/10085, titled "Modular window rail" can be given as another example of the state of the art. In the summary part of this document it is stated that: "The invention is related to a product that can very easily be installed and uninstalled, can be utilized as portable when desired and does not obstruct the expected window functions, in cases of emergency, such as fire, earthquake, etc., enables exit through the window, can be easily cleaned and specifically prevents children to uncontrollably lean out and fall from the window; that is made up of rail vertical profiles, rail locking pin, pin spring, pin holder, locking pin thread, locking pin socket, rail profiles and rail profile locking".

Utility model document numbered 2015/00180, titled "PVC protection" can be given as another example of the state of the art. In the summary part of this document it is stated that: "The invention is related to the opening parts of the windows on buildings that are minimum 1.5 meters high from the ground level; designed specifically to avoid children from falling through the opening parts of the windows that are minimum 1.5 meters higher from the ground level, to be connected to the exterior side of the window with an outward opening hinge, secured with a flap lock and lock bolt when closed, that does not need maintenance such as painting or lacquering, that consists of an open and a closed part and includes a fly screen to avoid passing of flies and insects on the open part when required".

Patent document U.S. Pat. No. 5,916,074, titled "Child safety window protection" can be given as another example of the state of the art. In the summary part of this document it is stated that: "A window protection to be installed on the window that prevents children or objects from falling is described. There is a pair of assembly brackets for installing the window protection on the window. End caps are connected to the first wire subassembly and second wired bottom part respectively. End caps are attached removable to the first and second assembly brackets. First wired subassembly and second wired sub assembly are connected to each other in a manner that enables the glass protection to fit different sizes of gap. The emergency release button that is installed on the first assembly bracket, fits in the end cap, allows the window protection to be removed in cases of emergency exit".

Patent document U.S. Pat. No. 5,492,164, titled "Window safety system for a child or alike" can be given as another example of the state of the art. In the summary part of this document it is stated that: "The system uses minimum one long extension element extending across the window width and fastened on the opposite guiding elements moving smoothly through the vertical rails. For moving along with bottom window sash, an end cap is attached against the vertical ends. Guiding elements attached serially to each other with a flexible belt inside vertical lines. System cap interacts with a sub-rail of one window sash in a way that when the window latch is lifted to open position, system cap moves along with the lower sash. This movement causes the guiding elements to be interpreted in the vertical rails and the blockage rods to be guided in horizontally in a position along with the window opening. This way, the prevention rods blocks the exit of a child or alike. When the window is closed, a reverse sequence takes place and the prevention rods roll on the window sill under the cap".

All the inventions mentioned above are based on rail or barrier principles, and they are aesthetically inconvenient products both from inside and outside perspective because of their thickness. As most of them are installed from outside by screwing on the wall or the window frame profile, they cause damage on the visible surface of the wall or window frame, therefore these products are avoided especially by tenants who are not the property owners. Additionally, as the dimensions of the opening window sashes may differ for each window, the products may require custom order. As the hinge type fly screens open outwards, they avoid the fly screens' movement.

There are also adjustable rail type products with the state of the art, but the cost and subsequently the prices of these products are high because of the amount of profile and adjustment apparatus used.

Therefore, the existence of the abovementioned issues and the inadequacy of the existing solutions necessitated a development in the relevant technical field.

SUMMARY

The primary aim of the invention is to achieve a new safety system for windows, by deriving advantages and eliminating the known disadvantages from the known state of the art.

Another main objective of the invention is to enable the installer to form the window gap vertically and horizontally with thin steel cord at the installation site and to build a reliable safety net by fastening these cords to each other.

Another main objective of the invention is to provide a system with less disturbing view and lower cost, as it is based on building a safety net by use of very thin steel cords, compared to the systems in the state of the art that install safety rails by using profiles.

Another main objective of the invention is for the safety system to have a practical structure, to be demountable by everyone including the users.

Another main objective of the invention is for the cords and connecting apparatus used in the safety system not to prevent the windows from closing.

Another main objective of the invention is for the safety system to be installed on the interior part of the window, not to constitute an obstruction for the fly screens connected to the window frame from outside.

Another main objective of the invention is for the system not to lose its safety even when one of the mounting screws is removed or the cord is cut at one location, as the cords and connecting apparatus are safely connected to each other.

Another main objective of the invention is that the safety system is compatible with windows of all dimensions and that it is mass-produced.

Another main objective of the invention is the ease of transportation as the parts used in the safety system are very light and use very little space.

Another main objective of the invention is for the steel cords to be sturdy enough not to be broken or cut with knife or scissors by children, and meanwhile they can be cut by adults with pliers, to use the windows conveniently for evacuation in cases of emergency.

BRIEF DESCRIPTION OF THE DRAWINGS

The structural and characteristic features of the invention and all advantages thereof will be more clearly understood by the following figures and detailed description with reference to these figures. For this reason, evaluation should be made by taking these figures and detailed descriptions into consideration.

NO PART NAME

Figure 1:
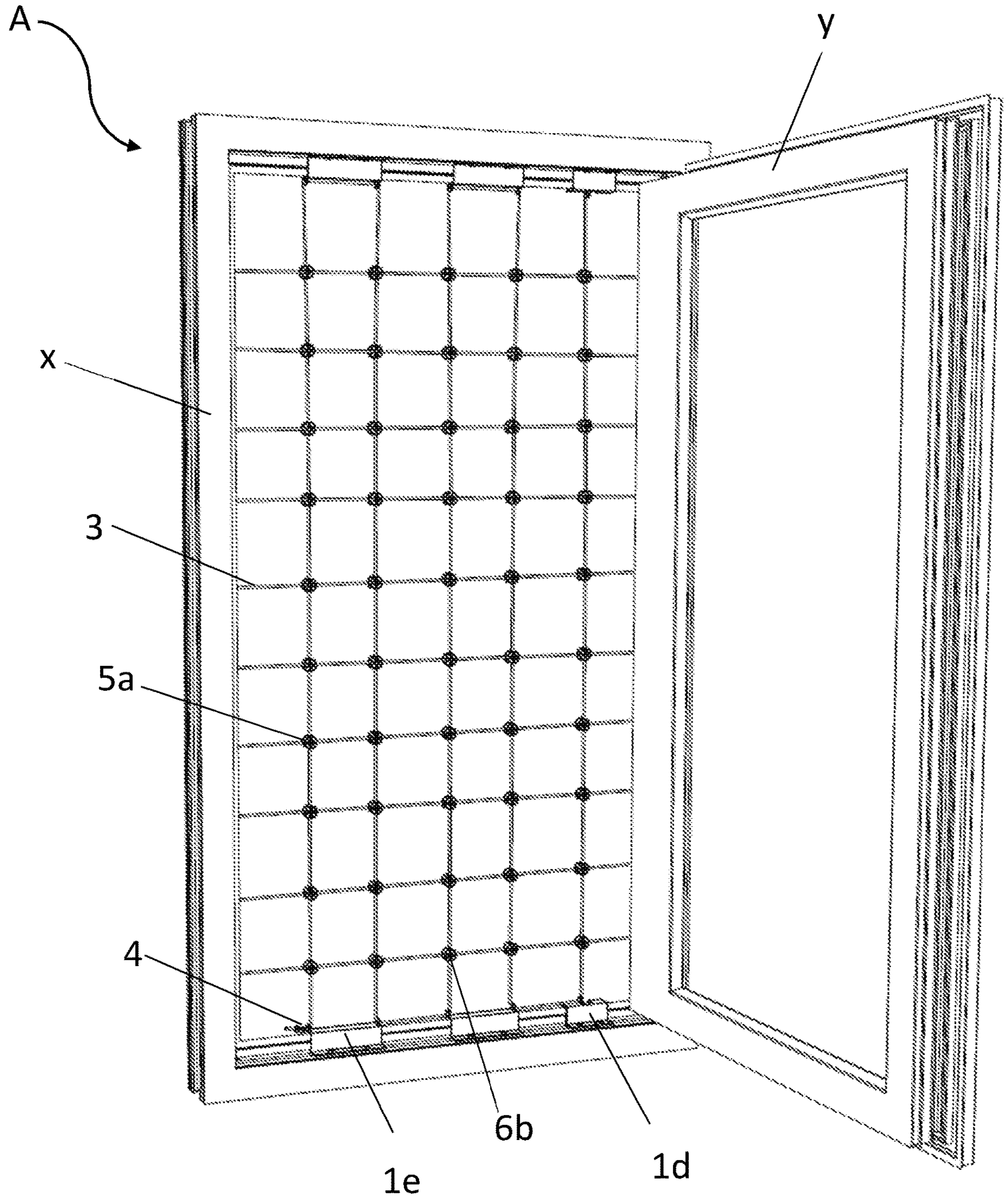
FIG. 1: General view of the child window safety system on the window.
Figure 2:
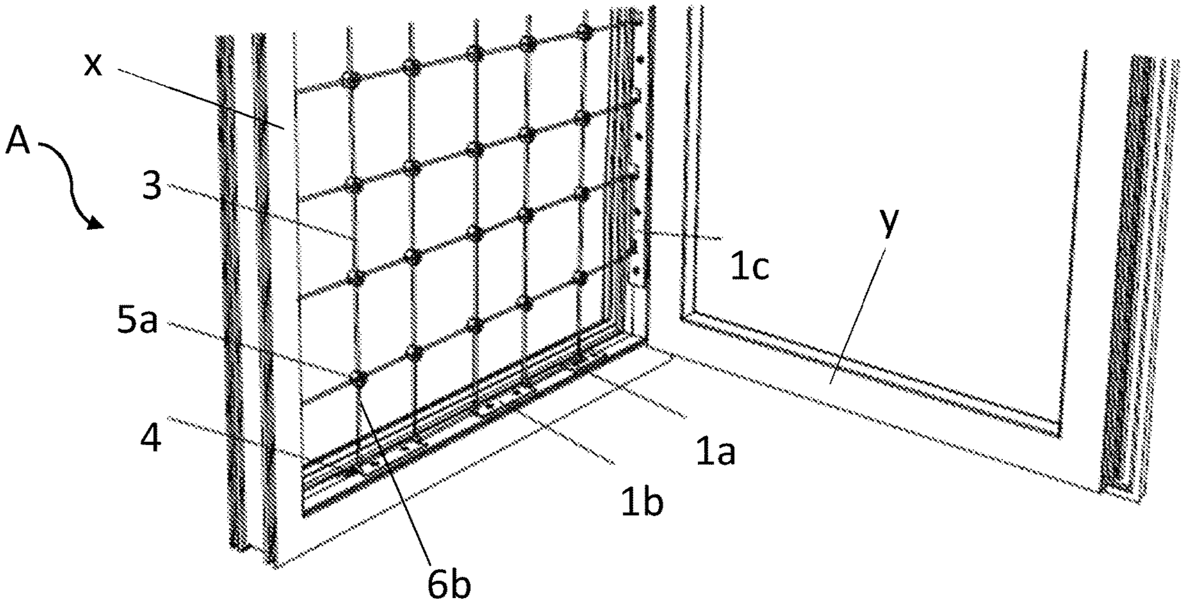
FIG. 2: Detailed view of the child window safety system with single, double and multiple connection profiles.
Figure 3:
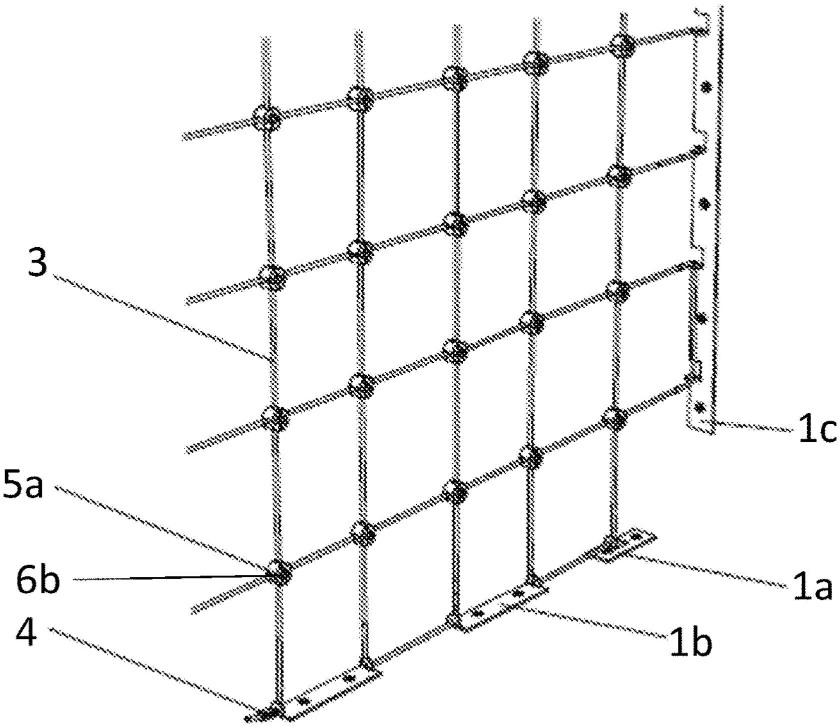
FIG. 3: General view of the uninstalled child window safety system with single, double and multiple connection profiles.
Figure 4:
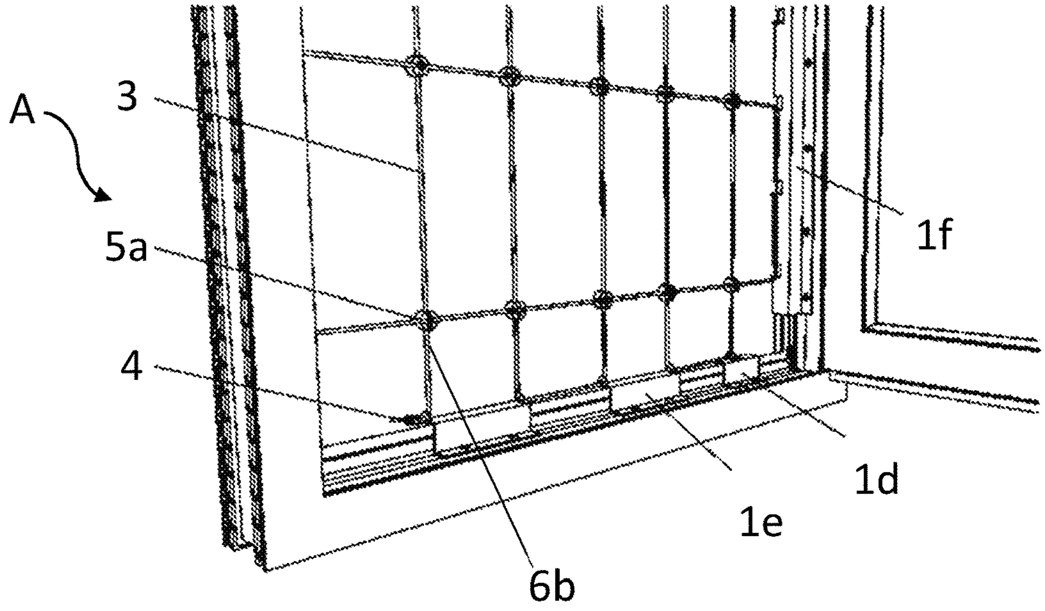
FIG. 4: Detailed view of the child window safety system on the window, with stepped single, double and multiple connection profiles.
Figure 5:
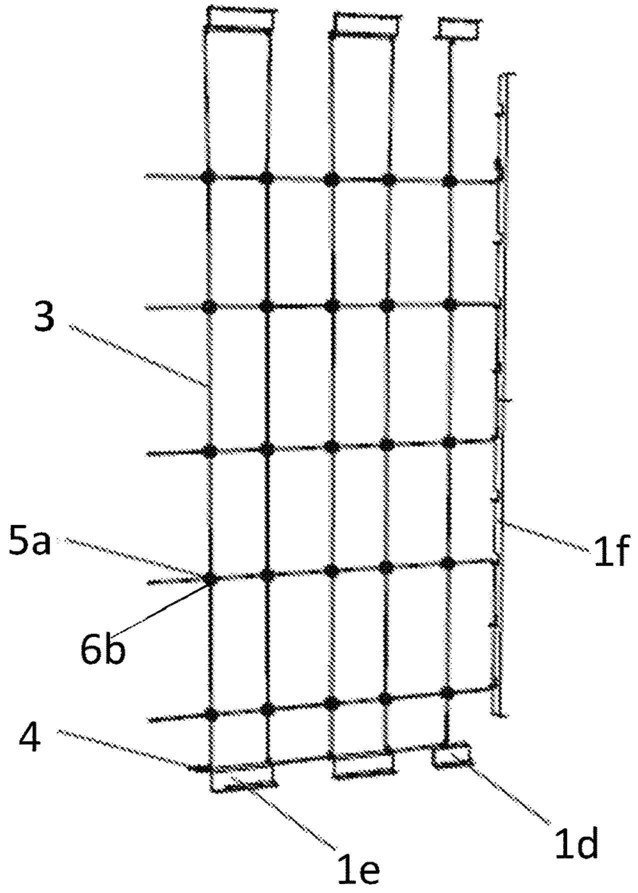
FIG. 5: General view of the uninstalled child window safety system with stepped single, double and multiple connection profiles.

1*a* Single cord connection profile
1*b* Double cord connection profile
1*c* Multiple cord connection profile
1*d* Stepped single cord connection profile
1*e* Stepped double cord connection profile
1*f* Stepped multiple cord connection profile
2.1 Standard profile connection hole
2.2 Standard profile mounting hole
3 Steel cord
4 Cord end clip
5*a* Metal fixing part used in fixing the cords
5*b* Plastic clamp part used in fixing the cords
6 Sets screw
A Child window safety system
x Fixed window frame
y Moving window sash
m: intermediate distance

DETAILED DESCRIPTION OF THE EMBODIMENTS

In this detailed description, the child window safety system subject to the invention is described as an example only for better understanding and without generating any limiting effect.

The invention is about an aesthetic and reliable child window safety system (A), that can be installed and uninstalled easily and can be mas produced compatibly with all window sizes, specifically to prevent children to lean out and fall through open windows, and its general structure includes:

- a flat form single cord connection profile (1*a*) with a single standard profile connection hole (2.1) to enable a single steel cord (3) to be attached and two standard profile mounting holes (2.2) to enable connection with the fixed window frame (x)
- a flat form double cord connection profile (1*b*) with two standard profile connection holes (2.1) to enable two steel cords (3) to be attached and two standard profile mounting holes (2.2) to enable connection with the fixed window frame (x)

a flat form multiple cord connection profile (1*c*) with multiple standard profile connection holes (2.1) to enable multiple steel cords (3) to be attached and multiple standard profile mounting holes (2.2) to enable connection with the fixed window frame (x)

a single cord stepped connection profile (1*d*) with a single standard profile connection hole (2.1) to enable a single steel cord (3) to be attached and two standard profile mounting holes to enable connection with the fixed window frame (x)

a double cord stepped connection profile (1*e*) with two standard profile connection holes (2.1) to enable two steel cords (3) to be attached and two standard profile mounting holes (2.2) to enable connection with the fixed window frame (x)

a multiple cord stepped connection profile (1*f*) with multiple standard profile connection holes (2.1) to enable multiple steel cords (3) to be attached and multiple standard profile mounting holes (2.2) to enable connection with the fixed window frame (x)

steel cord (3) passing through the standard profile connection holes (2.1) on single cord connection profile (1*a*), two cord connection profile (1*b*), multiple cord connection profile (1*c*) or single cord stepped connection profile (1*d*), double cord stepped connection profile (1*e*), multiple cord stepped connection profile (1*f*), and that is prevented from releasing by a cord end clip (4), a metal fastening part (5*a*) attached to the vertical and horizontal intersection points of steel cords (3) used for fixing the cord or a plastic clamp part (5*b*) used for fixing the cord.

FIG. 1 illustrates the installation of the child window safety system (A) on fixed window sash (x)

Figure 6:
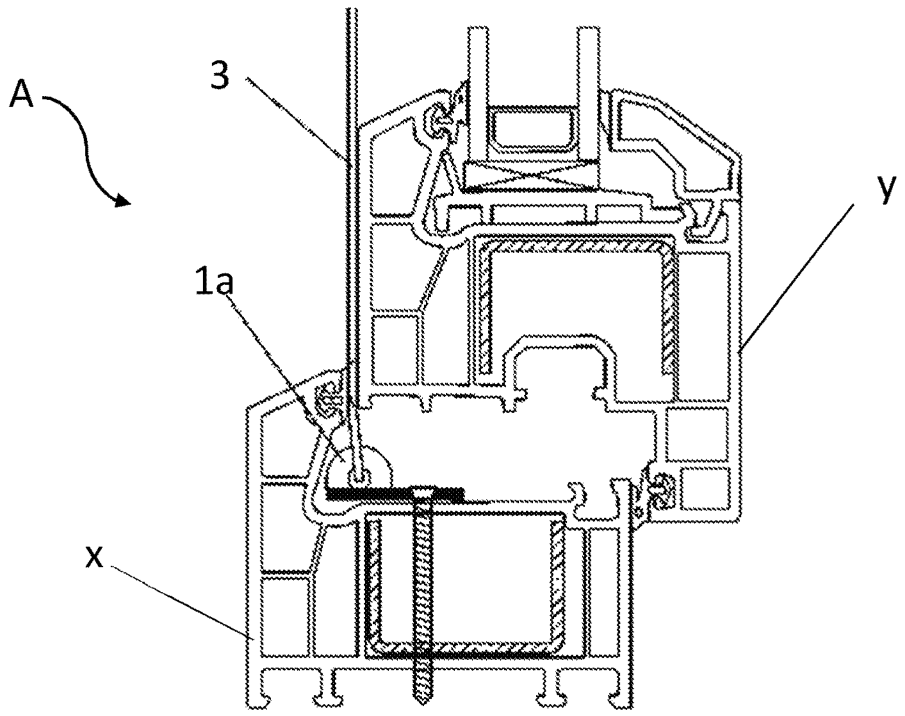
FIG. 6: Sectional view of the cord connection profile inside flat window sash.
Figure 7:
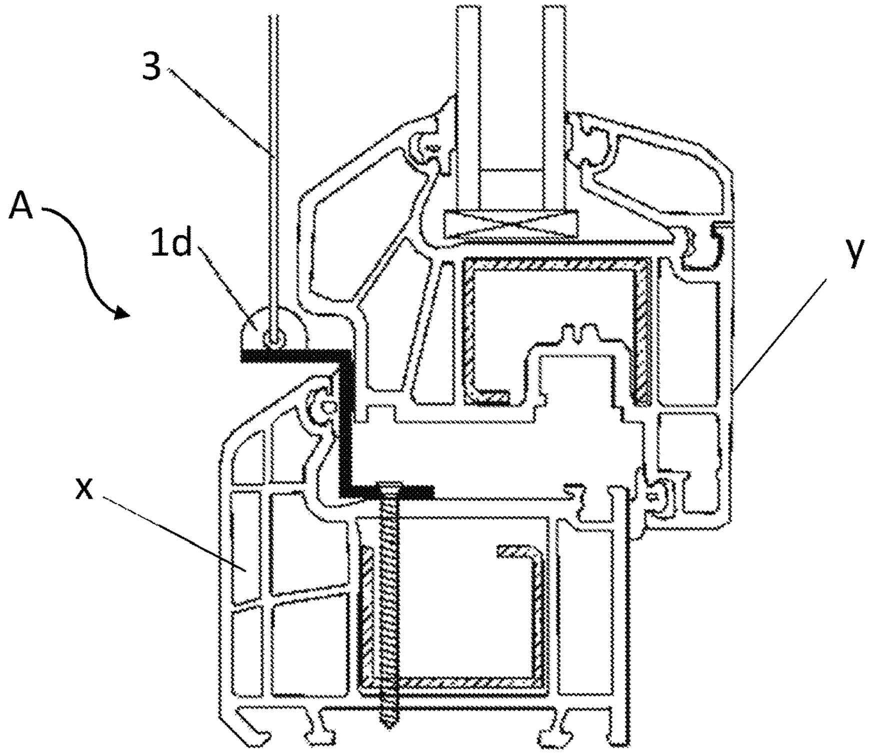
FIG. 7: Sectional view of stepped cord connection profile inside drain type window sash
Figure 8:
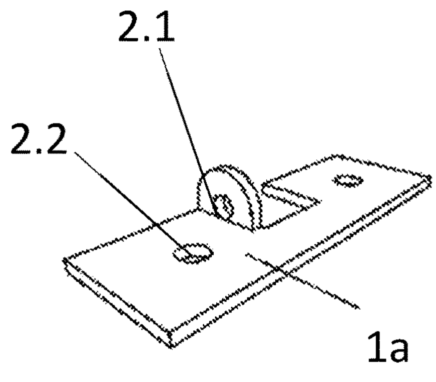
FIG. 8: Perspective view of single cord connection profile.

In the existing state of the art, the movable window sashes (y) opening and closing with the hinges on the fixed window frame (x) have 2 different structures, either in flat form (FIG. 6) or outward drain form (FIG. 7).

The child window safety system (A) can be installed on the fixed window frame (x) in two different ways, either via a flat form single cord connection profile (1*a*), double cord connection profile (1*b*) and multiple cord connection profile (1*c*) or an stepped form single cord connection profile (1*d*), an stepped form double cord connection profile (1*e*) and an stepped form multiple cord connection profile (1*f*).

As can be seen in detail in FIG. 6, single cord connection profile (1*a*), double cord connection profile (1*b*) and multiple cord connection profile (1*c*) are manufactured in flat form to be fastened on the interior of the fixed window frame (x) including a flat form window sash (y) and these connection profiles (1*a*-1*b*-1*c*) are fastened on fixed window frame (x) through the standard profile mounting holes (2.2), from the interior.

As can be seen in detail in FIG. 7, single stepped cord connection profile (1*d*), double stepped cord connection profile (1*e*) and multiple stepped cord connection profile (1*f*) are manufactured in stepped form to be fastened on the interior of the fixed window frame (x) including an outward drain form window sash (y) and these connection profiles (1*d*-1*e*-1*f*) are fastened on fixed window frame (x) through the standard profile mounting holes (2.2), from the interior.

Figure 9:
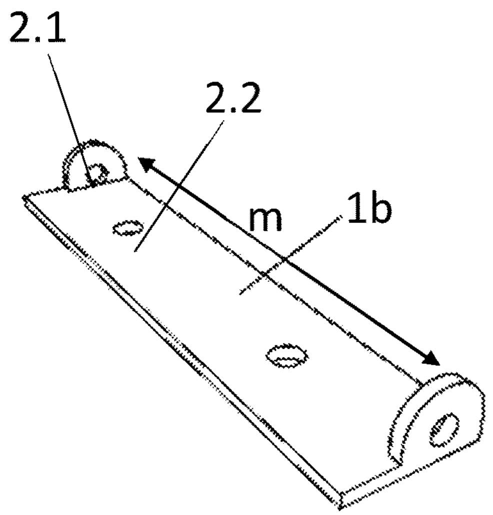
FIG. 9: Perspective view of double cord connection profile.
Figure 12:
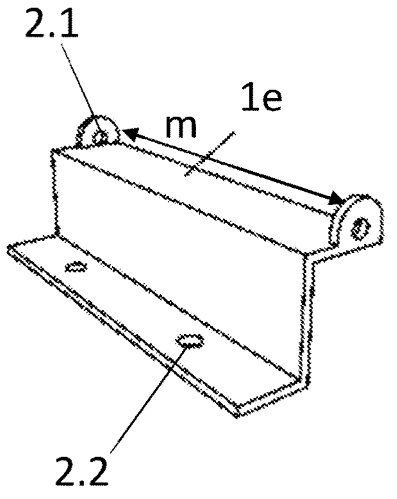
FIG. 12: Perspective view of stepped double cord connection profile.

The intermediate gap (m) between the two standard profile connection holes (2.1) placed correspondingly on both sides of the flat form double cord connection profile (1*b*) as can be seen in FIG. 9, and the double cord stepped connection profile (1*e*) as can be seen in FIG. 12, connecting the steel cords (3) is preferably 10 cm's (to become maximum 12 cm's when the steel cords (3) are extended). With larger gaps (m), there is the risk for children to fall through the steel cords (3).

Figure 10:
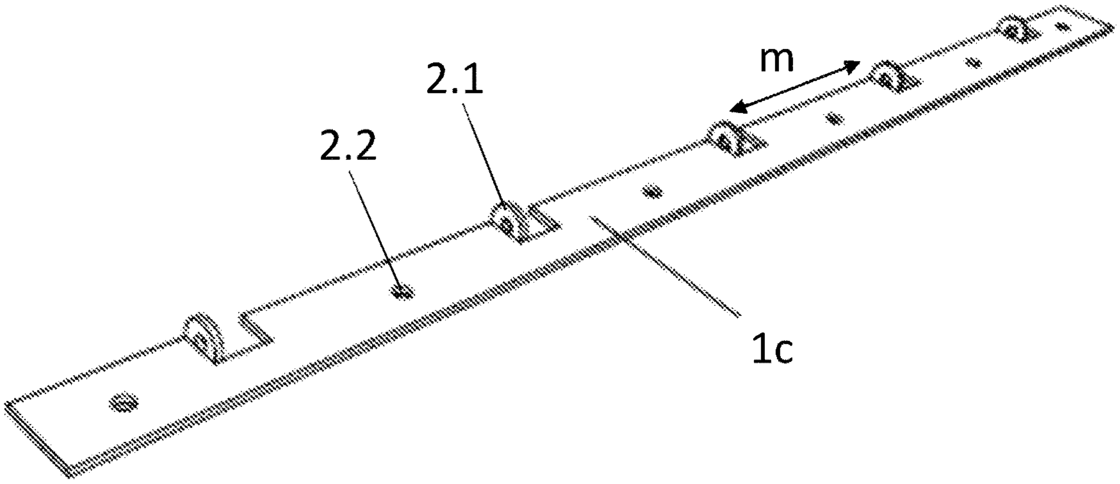
FIG. 10: Perspective view of multiple cord connection profile.
Figure 11:
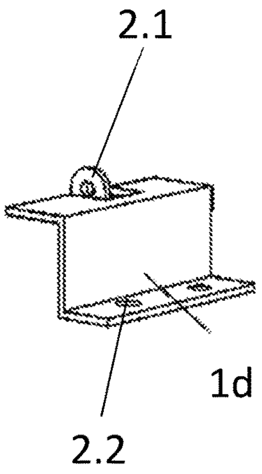
FIG. 11: Perspective view of stepped single cord connection profile.
Figure 13:
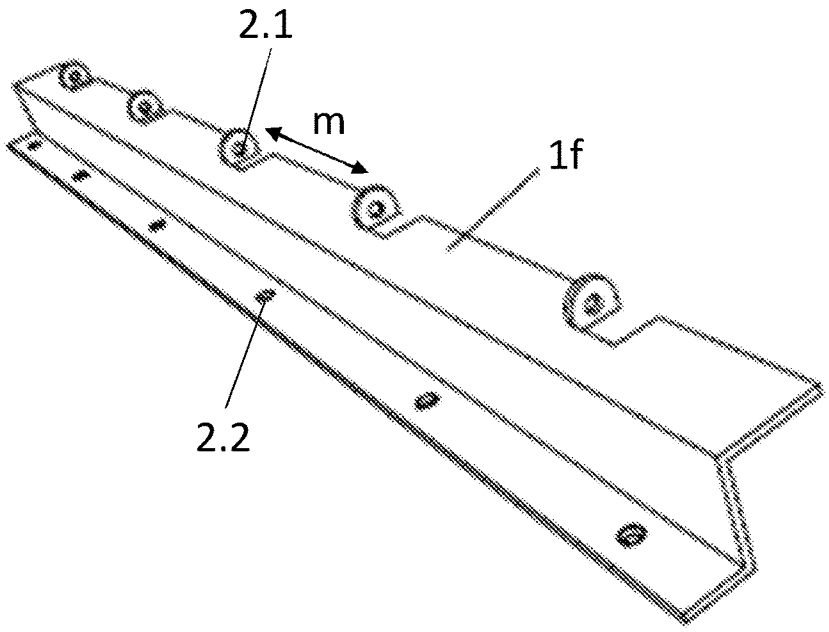
FIG. 13: Perspective view of stepped multiple cord connection profile.
Figure 14:
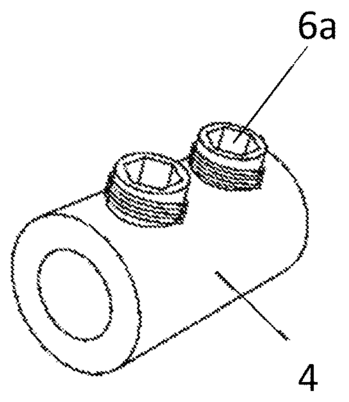
FIG. 14: Perspective view of the cable end clamp.
Figure 15:
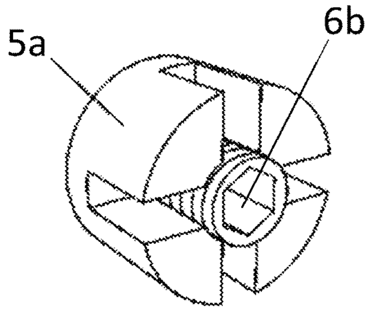
FIG. 15: Perspective view of the metal fixing part used in the fixing the cords.
Figure 16:
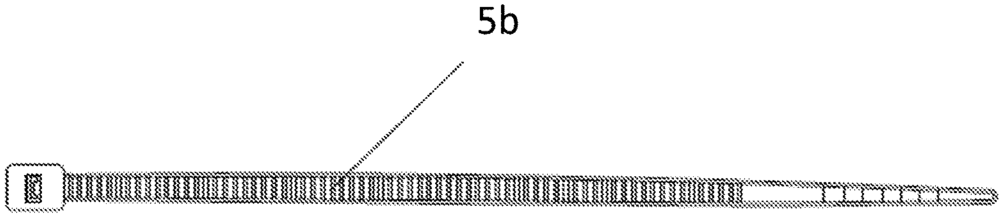
FIG. 16: View of the plastic clamp part used in fixing the cords
Figure 17:
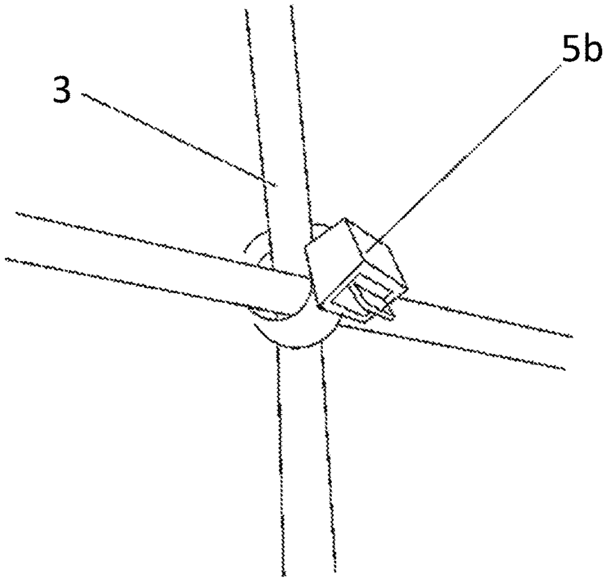
FIG. 17: Perspective view of the plastic clamp part used in fixing the cords on steel cords.

The intermediate gap (m) between the multiple standard profile connection holes (2.1) placed on the flat form multiple cord connection profile (1*c*) as can be seen in FIG. 10 and the stepped form multiple cord stepped connection profile (1*f*) as can be seen in FIG. 13, is preferably 10 cm's (to become maximum 12 cm's when the steel cords (3) are extended).

Installation of the child window safety system (A) is as follows;

Movable window sash (y) is opened and if the window sash (y) is in flat form (FIG. 6) single cord connection profile (1*a*), double cord connection profile (1*b*) and multiple cord connection profile (1*c*), if the window sash is in outward drain form (FIG. 7) single cord stepped connection profile (1*d*), double cord stepped connection profile (1*e*) and multiple cord stepped connection profile (1*f*) are screwed and fastened through the standard mounting holes (2.2) on the interior part of the fixed window frame (x) in 10 cm intermediate gaps. Then steel cord (3) is pulled through the standard profile connection holes (2.1) and knitted vertically and horizontally in parallel form. After knitting and tightening of the steel cords (3), cord end clips (4) are placed on the ends and the steel cords (3) are fixed by clenching the set screws (6*a*) that are on top of these clips (4).

As the steel cords (3) may extend and the gaps may enlarge if forced manually, to prevent this issue, metal cord fastening part (5*a*) used for fixing cords, are attached at the vertical and horizontal intersection points of the steel cords (3) and fixed by using the set screws (6*b*) installed on them, or plastic clamp part (5*b*) used for rope fastening is installed for fixing. The metal cord fastening part (5*a*) used for fixing ropes or the plastic clamp part (5*b*) used for fixing ropes has the same functionality and their use depend on preference. Metal cord fastening part (5*a*) used in rope fastening is made of stainless material and has ducts where the steel cords (3) aligned from both sides can be easily seated.

By placing the metal cord fastening part (5*a*) used for fixing ropes or the plastic clamp part (5*b*) used for fixing ropes, at the intersection points of vertical and horizontal steel cords (3), a reliable safety net of steel cord is built.

As the flat form single cord connection profile (1*a*), double cord connection profile (1*b*) and multiple cord connection profile (1*c*), or single cord stepped connection profile (1*d*), double cord stepped connection profile (1*e*), multiple cord stepped connection profile (1*f*), and steel cords (3) installed on the fixed window frame (x), do not obstruct the closing of the movable window sash (y), as they lie within the gasket thickness between the movable window sash (y) and the fixed window frame (x).

As the fly screens are installed on the exterior of the fixed window frame (x), they do not obstruct the child window safety system (A). The child window safety system (A) provides a base for new fly screen to be installed; it can be connected to the fly screen.

The child window safety system (A) is also suitable for use especially on French balcony styles.

By using the ready made rope nets, instead of steel cords (3) between the flat form single cord connection profile (1*a*), double cord connection profile (1*b*) and multiple cord connection profile (1*c*), or the stepped form single cord stepped connection profile (1*d*), double cord stepped connection profile (1_e_), multiple cord stepped connection profile (1_f_) installed on the fixed window frame (x), it is possible to form a safety net for home pets.

What is claimed is:

1. An easy-installation child window safety system for preventing children from leaning out and falling through open windows, comprising:

a flat form single cord connection profile with a single profile connection hole to which a first steel cord is attached, wherein the flat form single cord connection profile further includes two profile mounting holes for connecting to a window frame; wherein the profile connection hole is oriented so that an axis of the profile connection hole through which the first steel cord runs is parallel to a first surface of the window frame;

a flat form double cord connection profile with two profile connection holes unitarily integrated into the double cord connection profile to which the first steel cord is attached, wherein the flat form double cord connection profile further includes two profile mounting holes for connecting to the window frame; wherein the profile connection holes of the double cord connection profile are oriented so that axes of the profile connection holes of the double cord connection profile through which the first steel cord runs are parallel to the first surface of the window frame;

a flat form multiple cord connection profile with multiple profile connection holes unitarily integrated into the multiple cord connection profile to which a second steel cord is attached, wherein the flat form multiple cord connection profile further includes multiple profile mounting holes for connecting to the window frame; wherein the profile connection holes of the multiple cord connection profile are oriented so that axes of the profile connection holes of the multiple cord connection profile through which the second steel cord runs are parallel to a second surface of the window frame that is perpendicular to the first surface;

at least one cord end clip to prevent the first steel cord and the second steel cord from releasing; and at least one metal or plastic fastening part attached to intersection points between the first steel cord and the second steel cord.

2. The easy-installation child window safety system according to claim 1, wherein the flat form single cord connection profile, the flat form double cord connection profile, and the flat form multiple cord connection profile are installed on the window frame.

3. The easy-installation child window safety system according to claim 1, the first and second steel cords are secured inside the at least one metal or plastic fastening part by screws for clenching and fastening the first and second steel cords.

4. The easy-installation child window safety system according to claim 3, wherein the fastening part comprises intersecting ducts with an exposed side and the first and second steel cords are secured inside the ducts by the screws for clenching and fastening the first and second steel cords.

5. An easy-installation child window safety system for preventing children from leaning out and falling through open windows, comprising:

a single cord stepped connection profile with a single profile connection hole to which a first steel cord is attached, wherein the single cord stepped connection profile further includes two profile mounting holes for connecting to a window frame; wherein the profile connection hole is oriented so that an axis of the profile connection hole through which the first steel cord runs is parallel to a first surface of the window frame;

a double cord stepped connection profile with two standard profile connection holes unitarily integrated into the double cord connection profile to which the first steel cord is attached, wherein the double cord stepped connection profile further includes two profile mounting holes for connecting to the window frame; wherein the profile connection holes of the double cord connection profile are oriented so that axes of the profile connection holes of the double cord correction profile through which the first steel cord runs are parallel to the first surface of the window frame;

a multiple cord stepped connection profile with multiple profile connection holes unitarily integrated into the multiple cord connection profile to which a second steel cord is attached, wherein the multiple cord stepped connection profile further includes multiple standard profile mounting holes for connecting to the window frame; wherein the profile connection holes of the multiple cord connection profile are oriented so that axes of the profile connection holes of the multiple cord connection profile through which the second steel cord runs are parallel to a second surface of the window frame that is perpendicular to the first surface;

at least one cord end clip to prevent the first steel cord and the second steel cord from releasing; and at least one metal or plastic fastening part attached to intersection points between the first steel cord and the second steel cord.

6. The easy-installation child window safety system according to claim 5, wherein the single cord stepped connection profile, the double cord stepped connection profile, and the multiple cord stepped connection profile are installed on the window frame.

7. The easy-installation child window safety system according to claim 5, wherein the first and second steel cords are secured inside the at least one metal or plastic fastening part by screws for clenching and fastening the first and second steel cords.

8. The easy-installation child window safety system according to claim 7, wherein the fastening part comprises intersecting ducts with an exposed side and the first and second steel cords are secured inside the ducts by the screws for clenching and fastening the first and second steel cords.

* * * * *